April 25, 1961 J. E. CHEETWOOD 2,981,033
FLOWER HOLDER
Filed Aug. 19, 1957 2 Sheets-Sheet 1
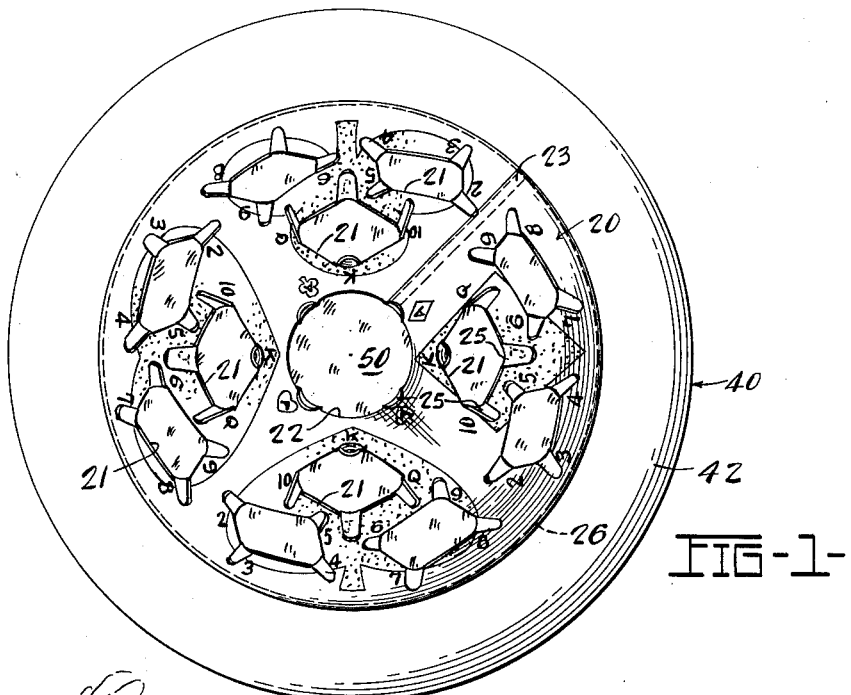
FIG-1-
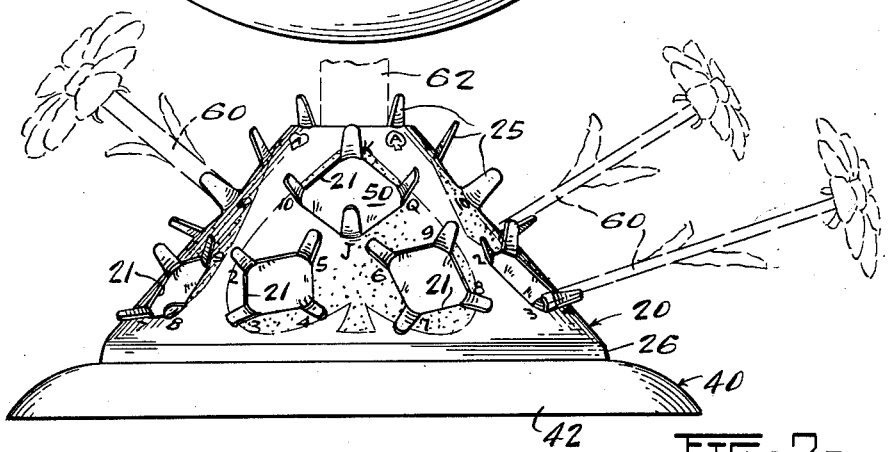
FIG-2-
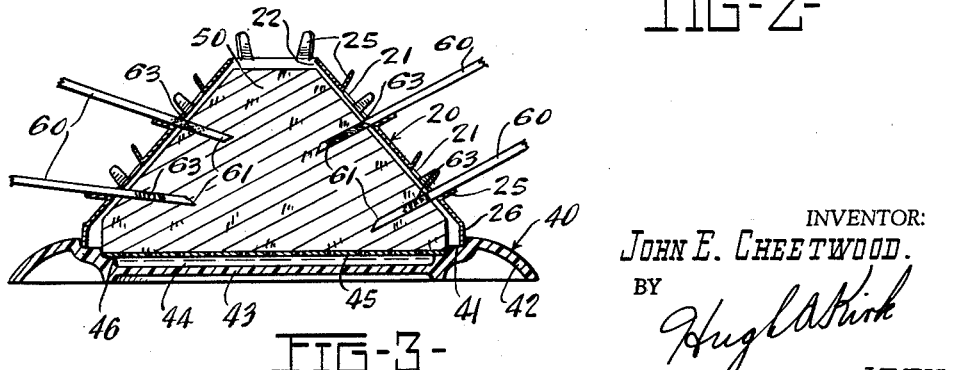
FIG-3-
INVENTOR:
JOHN E. CHEETWOOD.
BY
Hugh A Kirk
ATTY.

April 25, 1961 J. E. CHEETWOOD 2,981,033
FLOWER HOLDER
Filed Aug. 19, 1957 2 Sheets-Sheet 2
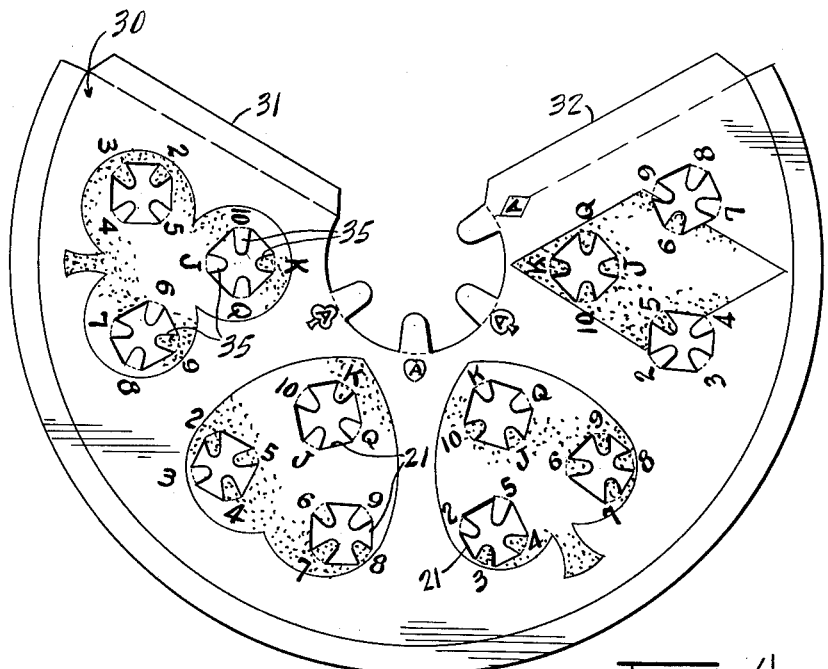
FIG-4-
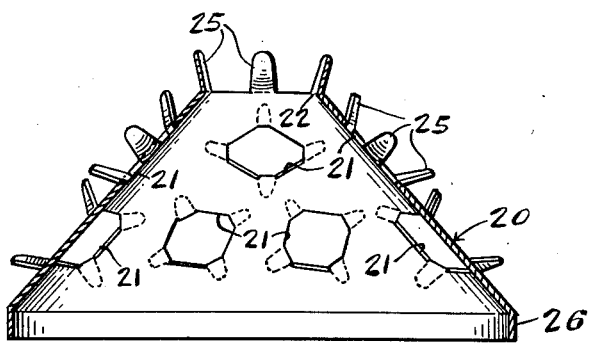
FIG-5-
INVENTOR:
JOHN E. CHEETWOOD.
BY
*Hugh A Kirk*
ATTY.

United States Patent Office 2,981,033
Patented Apr. 25, 1961

2,981,033

FLOWER HOLDER

John E. Cheetwood, 333 N. Main St.,
Bowling Green, Ohio

Filed Aug. 19, 1957, Ser. No. 678,858

5 Claims. (Cl. 47—41)

This invention relates to an improved flower holder and system for arranging flowers therein. More particularly, it deals with such a flower holder which not only provides a support and water supply for the stems of flowers, but also guides for directing the stems in different angles from the holder. The system of arrangement includes means for identifying flowers or stems of different lengths, such as by different colored markings on their stems, and letter and/or number symbols for identifying the guides in the holder, in combination with a chart or plurality of charts which indicate which colored stems are to be placed along which numbered guides to make a predetermined display.

Accordingly, it is an object of this invention to produce a simple, efficient, effective, economic and reusable flower holder which is adaptable for a wide variety of "do-it-yourself" flower arrangements directed by simple charts and pre-packaged combinations of flowers.

Another object is to provide such a holder which is a complete unit in itself and requires no vase or dish and may be employed for either freshly cut flowers or dried flowers, foliage, or stem-like decorative objects, such as candles or flags.

Generally speaking, the basis of this invention resides in the holder itself which comprises a hollow, rigid dome-like form, such as a hemisphere or truncated cone or pyramid, and which contains a plurality of relatively large apertures, including one at the top center thereof, each of which apertures has at least one trough shaped guide projecting at a predetermined angle from the edge of the aperture, preferably outwardly from the outside surface of the dome, for guiding the stems of flowers through the aperture into a porous deformable stem-supporting material housed inside the dome, such as a porous plastic liquid absorbing material, as "Styrofoam," "Oasis" or "Sno-pac," or moss, or similar material. It is desirable that the apertures or holes in the dome be sufficiently large so that more than one trough guide can be located at the edge of each hole, which guides may be pre-set at different angles, so that from substantially the same position on the dome or flower holder, stems may be placed in more than one different angle depending upon which guide is employed. The trough shaped guides are preferably made integral with the sheet material of the dome and may be stamped therefrom and given their angular position from a mold.

The dome enclosing the deformable stem supporting material may also be provided with a wide base dish or tray support which may have an outwardly and downwardly extending flange for stabilizing the holder, and a central recess or cavity portion under the dome as a reservoir for liquid or water which may drip from the liquid saturated porous deformable stem-supporting material when the stems are forced therein. In order to prevent this stem-supporting material from filling this cavity, there may be provided a porous plate which may rest on legs or a ridge in the dish to support and space the material from the bottom of the cavity.

Each of the trough guide means may be identified by numbers and/or letters, such as for example: in a holder having 13 holes (four groups of three holes plus one at top of dome) and 4 guides at different angles at each hole, these guides may correspond to the letters and numbers in a deck of fifty-two playing cards, with the four groups of three holes corresponding to each of the four suits in a deck, with all the aces, for example, identifying the four guide means around the central top or thirteenth aperture in the dome. Thus with an arrangement chart and a group of stems of flowers of different lengths, which different lengths may be identified by different colored painted or dipped strips or flags on the stems, such as for example, flowers having stems of 15 inches, 12 inches, 9 inches, 6 inches and 4 inches in length may have stems with colored strips of red, blue, yellow, black and white, respectively, one can make up a display arrangement oneself, by, for example, poking a blue stem along the seven of diamonds guide into the deformable stem-supporting material, a red stem along the ace of hearts guide, a white stem along a king of spades guide, etc., until the arrangement is completed.

The above mentioned and other features and objects of this invention and the manner of attaining them will become more apparent and the invention itself will be best understood by reference to the following description of an embodiment of the invention taken in conjunction with the accompanying drawings, wherein:

Fig. 1 is a plan view of a complete flower holder unit according to one embodiment of this invention, having a truncated cone shaped dome with thirteen holes, each having four differently angled trough guides around its periphery;

Fig. 2 is a side elevation of the holder unit shown in Fig. 1, with a few flowers and a candle shown in dotted lines supported therein;

Fig. 3 is a central vertical section through the holder unit shown in Fig. 2, on a reduced scale, showing the contour of the base dish of the unit with a perforated porous stem-supporting material disk therein;

Fig. 4 is an expanded vew of a sheet metal blank for making the truncated cone holder of the unit shown in Figs. 1, 2 and 3; and Fig. 5 is a central vertical sectional view through the completely formed truncated cone holder made from the blank shown in Fig. 4.

Referring to the drawings, the specific embodiment of this invention disclosed therein comprises a truncated cone shaped dome flower holder guide member 20 having four groups of three large apertures or holes 21 around the conical surface thereof and one larger aperture or hole 22 in the truncated top center of the dome 20, each of which holes are provided with similar trough shaped guide means or projections 25.

Each of the guides 25 is shown herein to be identified by a separate symbol, number or letter corresponding to the different cards in each of the four suits of Clubs, Hearts, Spades and Diamonds of a deck of playing cards, with the twelve cone side holes 21 grouped into four groups of three holes each over a design according to each of the four suits of a deck of playing cards. Each of the holes has its guides 25 preferably arranged to be located as far away as possible from the next nearest guide on the closest adjacent hole. Thus, the corners of the substantially square shaped holes 21 having the guides 25 are distributed so as to be as radially and evenly spaced over the surface of the cone dome 20 as possible, with even the guides 25 on the central larger top hole 22 being spaced in between the four groups of three holes 21.

The angle at which the trough shaped guides 25 project from the surface of the cone dome member 20 may vary from 90° to the horizontal or base of the dome, such as for the guides 25 near the top of the dome, to substantially 0° or parallel to the horizontal for the guides 25 near the base of the dome. Each of the holes 21, and preferably also the top hole 22, in the sides of the dome have their guides 25 directed at different angles, so that the stem of a flower or decorative means may be placed in each hole along a guide at any one of four different predetermined angles in substantially the same location or hole on the holder.

Thus, by selecting the properly indicated guide for each hole, an almost infinite variety of combinations and flower arrangements can be indicated on charts to direct a flower arranger, in that at least four and preferably five different lengths of stems of different types of flowers may be provided, which different length stems may have different colored flowers thereon and further be identified thereby to increase the variety of arrangements. Although it is not necessary that each guide in each hole in the holder member 20 be employed in each flower arrangement which oftentimes is the case, a very compact arrangement is possible in that the holes 21 and 22 are sufficiently large to permit four ordinary stems of flowers to be placed therein. Generally however, ordinary flower arrangements contain not more than about two dozen different stemmed items or flowers, so that rarely more than two different stems are placed in one hole. Also foliage and even green covering material may be provided for hiding the back or all of the holder when an arrangement is completed, if such is required.

The rigid truncated cone or dome member 20 may be die cast or molded or stamped or formed of a substantially rigid sheet of metal or plastic material into a blank 30 such as that shown in Fig. 4, in which the holes 21 and 22 have the blanks 35 for the trough guides 25 formed integral with their edges and the sheet 30. These blanks 30 and 35 may then be formed in another mold and the adjacent ends 31 and 32 of the blank 30 be fastened, soldered or welded together as at seam 23 (see Fig. 1) to form the basic holder dome 20 shown in Fig 5.

The lower peripheral edge of the conical member 20 may be provided with a flange to form a cylindrical ring section or portion 26 as shown in Figs. 3 and 5, so as to snap in a groove, rib, or channel 41 (see Fig. 3) provided in the upper edge of a supporting base dish or plate member 40 to form a unit assembly. This base dish 40 may have an outwardly and downwardly extending circular flange portion 42, to provide a larger base support to add to the stability and reduce the tipping of the holder unit. The dish 40 is preferably also provided with a central recessed or cavity portion 43 to provide a space 44 for the collection of water or liquid which may drip from the porous stem-supporting material 50 placed inside of the dome member 20. This porous deformable stem-supporting material 50 may be spaced from the bottom of the recessed portion 43 of the base dish 40 by a perforated disk or plate 45 which may rest on three or more legs, projections, or a ridge 46 formed around the inside edge of the cavity or recessed space 44. The dish base member 40 and disk 45 may be made of metal, ceramic or plastic material and may be decorated or painted to match the dome member 20, as desired.

The deformable stem-supporting material 50 placed inside the guide supporting dome member 20 and above the base dish 40 and perforated plate 45, may be composed of a sufficiently porous material to be immersed and impregnated with water, or liquid which may contain plant food dissolved therein, before the cut flowers are stuck therein, to increase their fresh life. This deformable material 50 should be easily penetrated by the ends 61 of stems 60 of cut flowers as shown in Figs. 2 and 3, or even the end of a candle 62, as shown in Fig. 2 placed in the central top opening 22, or by long thin candles which may be placed at angles in other openings 21. With a supporting material 50 of this type, it is not necessary always to employ wet flowers, but dry flowers and decorative arrangements having stems also may be employed in the holder of this invention. The material 50 may be formed in or to fit inside of the dome cover member 20.

In order to identify stems 60 of different lengths, there may be painted or indicated near their ends 61 different colored stripes, streaks or bands 63, as shown in Fig. 3, for easy identification. Furthermore, if desired, the combination of such bands and the color or type of flower also may be used for further varying the possible indications and display arrangement patterns, if more than one type of color or flower are provided of the same length in a given "do-it-yourself" arrangement flower package.

Although a support with different angled trough-guides 25 for the stems 60 of flowers is shown herein employing a system related to the fitfy-two different cards in a deck of playing cards, and grouped according to the suits therein, it is still within the scope of this invention to provide any other arrangement and symbol nomenclature for identifying the different angled trough guides. Also the number of holes, their size, and/or the number of guides placed around each of the holes, and their angles may be varied, in number, shape, length and direction, without departing from the scope of this invention. The dome member 20 should cover a stem-supporting material, if the stem guides 25 are not sufficiently troughed to do so. The dome or truncated pyramidal shaped guide supporting member 20 may take different dome-type shapes and the stem guides are provided therein, since this member 20 may be employed separately from its dish base 40 and disk 45. This is particularly true for dry arrangements wherein the recess 44 in the dish 40 for catching the liquid which may drip or be forced from the porous material 50 is not required. The perforated plate or disk 45 also may be omitted if the material 50 is sufficiently rigid to support itself on the legs or rim 46 in the dish 40.

It can readily be seen that according to the holder of this invention it is possible that once a holder of this type exists in a household, a local florist may advertise with charts according to the different seasons, months and/or holidays of the year, and supply at a comparative reasonable price pre-packaged bouquets of flowers. Thus, one having the holder of this invention, may have a wide selection of flower arrangements which may be pre-packaged by wholesalers to increase their regular volume of business which now often is quite seasonal. This invention also enables mass production and pre-packaging of flowers at central locations which may be ordered according to any one of a plurality of predetermined arrangements and combinations, so that a type of "do-it-yourself" arrangement kits may be sold to increase the sale of flowers, and have them present in many homes where the cost of having the florist to make an arrangement and send it would be too high for frequent requests.

Accordingly with this type of "do-it-yourself" arrangement kit, the florist may supply charts or combination directions of how to arrange the flowers in each kit according to one or more arrangements, each of which charts may contain a picture of the arrangement made according to the table given thereon. For example, one such arrangement may be entitled "Happy Birthday" and call for a pre-packaged box of eighteen red roses, which arrangement is designed for being placed on a buffet or mantlepiece with substantially all the flowers therein towards the front, top and sides of the holder. The red roses may be cut so that they have the following stem lengths: three 15" stems with white stripes at their ends, three 12" stems with silver stripes at their ends, three 9" stems with gold stripes at their ends, four 7" stems with black stripes at their ends, and five 5" stems with blue stripes at their ends. In order to make up this particular floral display, the combination chart for arrangement of the flowers would be as follows:

(1) One white stemmed flower along the ace of Diamonds guide
(2) One white stemmed rose in the 3 of Clubs guide
(3) One white stemmed rose in the 6 of Spades guide
(4) One silver stemmed rose in the ace of Hearts guide
(5) One silver stemmed flower in the 4 of Clubs guide
(6) One silver stemmed flower in the Jack of Spades guide
(7) One gold stemmed flower in the King of Hearts guide
(8) One gold stemmed rose in the King of Clubs guide
(9) One gold stemmed rose in the King of Spades guide
(10) One black stemmed rose in the 10 of Hearts guide
(11) One black stemmed rose in the Jack of Clubs guide
(12) One black stemmed rose in the 5 of Spades guide
(13) One black stemmed flower in the 10 of Spades guide
(14) One blue stemmed flower in the 7 of Hearts guide
(15) One blue stemmed flower in the 2 of Hearts guide
(16) One blue stemmed flower in the 9 of Clubs guide
(17) One blue stemmed rose in the Jack of Hearts guide
(18) One blue stemmed rose in the 10 of Clubs guide As can be seen by following the above arrangement chart in the order given, the longer stemmed flowers are inserted first and distributed over the holder in such a way that they will not cover up the indications at the guides for the stems to be placed later therein. This listing and making of charts for different arrangements can be made up and printed by a florist or wholesaler distributing any type of flowers, and a customer can choose according to the picture on the card what package they desire and then take it home and arrange it themselves according to the chart therewith. This materially decreases the time of the florist in making up bouquets which will decrease the cost of the flower displays, as well as appeal to the ingenuity of the person making the arrangement, who can say that they did it themselves for the admiration of their friends after it has been completed.

While there is described above the principles of this invention in connection with specific apparatus, it is to be clearly understood that this description is made only by way of example and not as a limitation to the scope of this invention.

What is claimed is:

1. A decorative holder comprising: a hollow dome type member having apertures therein, a plurality of spaced rigid trough shaped guides each having a width less than that of an aperture and projecting from the edge of each aperture outwardly away from the surface of said dome, a deformable porous material in said dome for supporting stems of flowers placed therein, whereby flower stems or the like placed through the apertures in the dome and into said material are guided along said guides to give a pre-determined angle to the position of their stems extending from said holder.

2. A holder according to claim 1 wherein said guides have inner trough guiding surfaces directed into said apertures.

3. A holder according to claim 1 wherein said guides are formed integral with said dome member and have a thickness substantially equal to that of said dome member.

4. A decorative holder comprising: a deformable stem supporting material, a rigid cover for said material having a plurality of apertures therein to expose said material, and at least two individual rigid guide means spaced opposite from one another at the edge of each aperture and extending outwardly from the surface of said cover at different angles, whereby a decorative object having a stem may have its stem guided through an aperture along one of said guide means into said material to be supported thereby at the angle corresponding to that of said guide means for producing a given decorative arrangement in said holder.

5. A holder according to claim 4 including decorative objects having stems of different lengths.

References Cited in the file of this patent

UNITED STATES PATENTS

| | | | |
|---|---|---|---|
| D. | 2,559 | Webster | Jan. 15, 1867 |
| | 165,456 | Vanstone | July 13, 1875 |
| | 1,740,057 | Babich | Dec. 17, 1929 |
| | 1,846,274 | Otwell | Feb. 23, 1932 |
| | 2,366,377 | Zois | Jan. 2, 1945 |
| | 2,761,233 | Brown | Sept. 4, 1956 |
| | 2,815,606 | Quackenbush | Dec. 10, 1957 |

FOREIGN PATENTS

| | | |
|---|---|---|
| 14,584 | Great Britain | Oct. 26, 1887 |
| 21,034 | Great Britain | Sept. 21, 1907 |